United States Patent [19]
Morey et al.

[11] 3,883,635
[45] May 13, 1975

[54] HYDRO-METALLURGICAL PREPARATION OF THE OXIDES OF ANTIMONY AND ANTIMONIC ACID

[75] Inventors: Booker W. Morey, Pasadena; John Richard McKinley, Claremont, both of Calif.

[73] Assignee: Occidental Petroleum Corp., Los Angeles, Calif.

[22] Filed: June 6, 1973

[21] Appl. No.: 367,451

Related U.S. Application Data

[63] Continuation of Ser. No. 213,929, Dec. 30, 1971, abandoned.

[52] U.S. Cl. .............. 423/87; 423/352; 423/511; 423/561; 423/617
[51] Int. Cl. ... C01b 29/00; C01c 1/00; C01b 17/00
[58] Field of Search .......... 75/69, 112, 149; 423/87, 423/352, 511, 561, 617

[56] References Cited
UNITED STATES PATENTS

| | | | |
|---|---|---|---|
| 531,169 | 12/1894 | Engelhardt | 204/105 |
| 1,007,877 | 11/1911 | Koenman | 106/25 |
| 2,258,441 | 10/1941 | Bozarth | 423/617 |
| 3,442,607 | 5/1969 | Ladenheim et al. | 423/617 |
| 3,531,261 | 9/1970 | Campagne | 23/311 |

Primary Examiner—Oscar R. Vertiz
Assistant Examiner—Hoke S. Miller
Attorney, Agent, or Firm—Christie, Parker & Hale

[57] ABSTRACT

Oxides of antimony are obtained from stibnite by first extracting stibnite from stibnite bearing ore or ore concentrate using an aqueous solution containing ammonium sulfide, sulfur and preferably ammonium hydroxide to form a solution containing stibnite and gangue. The stibnite containing solution is then separated from the gangue and distilled to recover ammonium sulfide and ammonium hydroxide leaving a residue of purified antimony sulfide and sulfur which is reacted in a nitric acid solution to form oxides of antimony including antimonic acid and sulfur which precipitates. The sulfur is leached from the oxides of antimony and the oxides dried or heated to elevated temperatures to convert the other oxides of antimony or reacted to form antimony metal.

15 Claims, 1 Drawing Figure

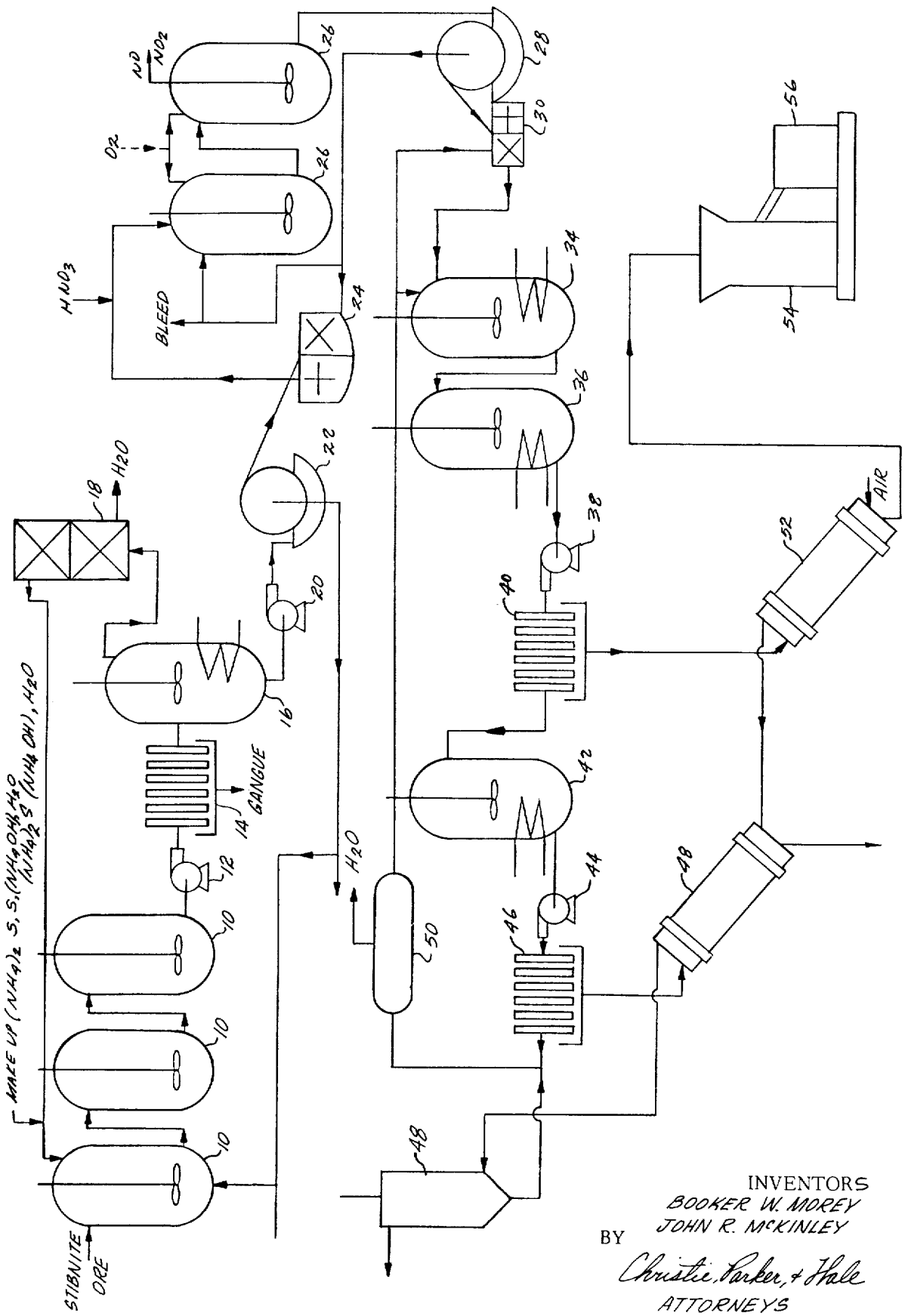

HYDRO-METALLURGICAL PREPARATION OF THE OXIDES OF ANTIMONY AND ANTIMONIC ACID

CROSS REFERENCE TO RELATED APPLICATIONS

This is a continuation of Appilcation Ser. No. 231,929, filed Dec. 30, 1972 now abandoned.

BACKGROUND OF THE INVENTION

Stibnite or antimony sulfide is found in a variety of ores. Dressing of the ores by various means including flotation will yield a high stibnite content concentrate which still contains normal, common contaminants, such as arsenic, lead, zinc, silver and the like.

Of these, arsenic is a particularly notorious contaminant in that its behavior is sufficiently similar to antimony in that it tends to be carried along with the antimony in conventional processes usually employed to convert stibnite to antimony metal, antimony oxide or other antimony derivatives.

In certain regions of the United States, for instance, the arsenic content of the ore can be as high as about 4 percent and such ores have not been, heretofore, processed to any extent for recovery of antimony because of the tendency of arsenic to remain as a contaminant in the product.

Several processes are generally employed for obtaining antimony or antimony derivatives from stibnite-bearing ores.

Some basically involve pyrometallurgical methods.

One such process involves direct oxidation in which stibnite is converted to volatilized antimony oxide by the reaction

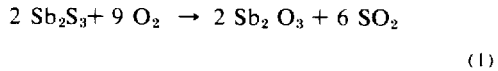

$$2\ Sb_2S_3 + 9\ O_2 \rightarrow 2\ Sb_2O_3 + 6\ SO_2 \quad (1)$$

The volatilized antimony oxide is recovered in flues, condensing pipes, baghouses, precipitators and the like.

The sulfur dioxide generated is generally vented to the atmosphere as a pollutant or presents a pollution control problem.

Another process involves merely heating the ore to melt the antimony sulfide which is drained from the ore as a liquid. The product is then converted to other antimony derivatives, however, sulfur dioxide is often generated as a by-product.

Stibnite has also been reacted directly with iron to form antimony metal. The antimony produced by such process is usually of low purity and volatilization losses high.

Blast furnance melting has also been employed, but capital costs are high and there is generated sulfur dioxide.

In U.S. Pat. 2,258,441 to Bozarth, there is disclosed a two-step process for preparing antimony compounds of high purity from impure antimony values. The process involves, as a minimum, a two-step operation. In the first step, the starting material, which may be an antimony bearing ore, is heated in an oxidizing atmosphere to a temperature at least sufficient to volatilize antimony trioxide. The vapors formed are condensed and contain many of the impurities present. The impure condensed antimony trioxide is then converted in an oxidizing atmosphere to antimony tetroxide which is then heated to some temperature short of its decomposition temperature. At the temperatures employed much of the impurities which condensed with the antimony trioxide are vaporized and separated. The antimony tetroxide may then be reduced to antimony trioxide in a highly purified state containing minor amounts of sulfur, selenium and lead as impurities.

SUMMARY OF THE INVENTION

The present invention relates to the process for producing high purity antimonic acid or the oxides of antimony from stibnite-bearing ores.

The process involves, in general, leaching antimony sulfide from an ore or a stibnite concentrate obtained by beneficiation of an ore with an aqueous solution comprising ammonium sulfide in the amount of from 5 to about 30 percent by weight, sulfur in an amount of from 0.1 to about 10 percent by weight, and from 0 to about 18 percent by weight ammonium hydroxide, the presence of sulfur in the solution being particularly beneficial in increasing the solubility of antimony sulfide in the leach solution. The solution containing dissovled antimony sulfide is then separated from the gangue.

The leach liquor formed may be neutralized for the elimination of ammonia but preferably distilled to recover the ammonium sulfide and ammonium hydroxide, when present, for recycle to the leach operation.

Whether distillation or neutralization is employed, the residue is a mixture of antimony sulfide and sulfur and includes some impurities such as some portion of the soluble arsenic compounds originally present in the ore. This phase, which may range from essentially solid to a fairly fluid slurry, may be filtered and washed or passed directly to the oxidation zone where the antimony sulfide is reacted with an aqueous 1 to about 70 percent nitric acid solution, preferably a solution about 2 to about 20 percent nitric acid, to form insoluble oxides of antimony and/or antimonic acid and additional elemental sulfur and gaseous nitrogen and/or its oxides, the other products of the reaction including most of the soluble arsenic compounds remaining in solution.

Sulfur is then separated from the formed precipitate by leaching with the solvent for sulfur, such as perchloroethylene or other separatory means and ultimately recovered as pure elemental sulfur.

The oxides of antimony, antimonic acid or mixtures thereof are then dried and recovered as such or heated to elevated temperature for conversion to other oxides of antimony or converted to antimony metal by reduction with hydrogen, carbon or carbon monoxide at elevated temperatures.

In the process of this invention, the nature of the antimony compounds which form, normally in an amorphous state, is dependent upon nitric acid concentration. Low concentrations favor the formation of $Sb_2O_3$, as concentration increases $Sb_2O_4$ may begin to form followed by the formation of $Sb_2O_5$ at higher concentrations. At about a nitric acid concentration of about 8 percent, it has been found that $Sb_2O_5$ is most likely in the form of the hydrated product of antimonic acid $H\ Sb(OH)_6$.

DRAWING

The attached drawing is a schematic illustration of one operation scheme which may be used for the production of the oxides of antimony and elemental sulfur in accordance with the practice of this invention.

DESCRIPTION

According to the present invention, there is provided a process for producing oxides of antimony, including antimonic acids, or antimony metal from crude stibnite ores.

The process, in general, comprises leaching stibnite from a stibnite-bearing ore or a stibnite ore concentrate, as obtained by flotation or other means, using an aqueous solution containing at least ammonium sulfide and sulfur and, when desired, ammonium hydroxide.

In the leaching operation, there is formed a basic aqueous solution containing dissolved antimony sulfide which is separated from the residual gangue by filtration or other means.

The leached liquor is then treated by neutralization of ammonia or distilled to recover ammonium sulfide and, when present, ammonium hydroxide for recycle to leave a solids residue which consists predominantly of antimony sulfide and sulfur.

The residue is then reacted with nitric acid optionally in the presence of oxygen to yield insoluble antimony compounds which are the oxides of antimony and/or antimonic acid and additional elemental sulfur as the principal products. The sulfur present is preferably separated from the oxides of antimony and/or antimonic acid by leaching with a solvent for the sulfur. Other means of sulfur separation are also possible.

As used herein, the term "oxides of antimony" is intended to include the species $Sb_2O_3$ as senarmontite or valentinite, and antimony pentoxide ($Sb_2O_5$) and cervantite ($Sb_2O_4$), to the extent it is formed during the oxidization of stibnite with nitric acid, as well as amorphous variations and mixtures thereof. Antimonic acid is intended to include a compound having the structure $HSb(OH)_6$ as identified by Girardi and Sabbioni "Journal of Radioanalytical Chemistry", Vol. 1, pp. 169–178 (1968).

The antimony compounds formed are generally amorphous and may be recovered as such by drying or heated in the presence of air or oxygen at elevated temperatures to form the other oxides of antimony as hereinafter described or converted to antimony metal by any conventional means.

With reference now to the Drawing, the first phase of the operation involves the leaching of antimony sulfide from stibnite-bearing ores or an upgraded stibnite concentrate, the latter being preferred to reduce the amount of materials handled.

Stibnite-bearing ores may, for instance, be concentrated by flotation operations to form a flotation concentrate containing about 60% antimony as antimony sulfide with little difficulty and the process of this invention will be described in terms of treating such a concentrate.

The concentrate is fed to one or more stirred leach reactors 10 in series where it is brought into contact with an aqueous solution comprising from about 5 to about 30 percent ammonium sulfide $(NH_4)_2S$ by weight, from about 0.1 to about 10 percent sulfur by weight and, when desired, up to about 18 percent by weight ammonium hydroxide $NH_4OH$. In this solution, the ammonium sulfide and, when present, the ammonium hydroxide serve to leach the antimony sulfide from the ore while the presence of sulfur increases the solubility of the extracted antimony sulfide in the aqueous solution.

Reaction is carried out over a period of time from about 0.25 to about 3 hours or more at temperatures ranging from ambient to about 90°C, preferably from ambient to about 70°C.

Upon completion of the leach operation, the gangue and the aqueous solution containing dissolved antimony sulfide is pumped by pump 12 to filter 14 where the gangue is separated from the aqueous leach liquor.

Depending on the nature of the ore introduced to the system, there may be retained by the gangue a variety of insolubles. There will normally be found in the gangue pyrites; arsenopyrite, a major source of arsenic in the ore and which is insoluble in the system employed; quartz; calcite; and when present, lead sulfide. Although the leach liquor has been illustrated as separated from the gangue by filtration, decantation and other well known techniques for separation of a liquid phase from a solid residue may be employed. The gangue is then normally treated by any known means for recovery of any mineral values contained therein.

The leach or mother liquor is then processed for removal of ammonia. This may be accomplished by simple neutralization of the solution. Preferably, however, the mother liquor is passed to a stirred distillation vessel 16 where the ammonium sulfide and, when present, ammonium hydroxide are volatilized and passed to concentrating tower 18 where the ammonium sulfide and, when present, ammonium hydroxide are taken off as an upper cut and excess water removed as a lower cut, for discarding to waste or recycle to the system after any purification which may be required. The ammonium sulfide, ammonium hydroxide, if present, exit at the top of column 18 for recycle to reactors 10, after addition of the required sulfur.

While there is illustrated in the drawing the use of three reactors, one or any number of reactors 10 in series may be employed depending on the residence time desired and the rate of passage of ore and leached liquor through the system.

In using a series of reactors, the leach liquor of minimal antimony concentration, is brought into contact with ore of high stibnite concentration and as the solution and ore are passed from reactor to reactor, the liquor become more concentrated with respect to antimony sulfide as the stibnite content of the ore is progressively reduced.

When ammonium sulfide and ammonium hydroxide are conserved as in the manner shown in the drawing, there is formed as a consequence of the distillation in stirred vessel 16 a concentrate of solid to liquid in consistency and containing predominantly antimony sulfide, sulfur and some impurities including some portion of the soluble arsenic compounds contained in the treated ore. The typical soluble arsenic compounds present being realgar and orpiment.

To facilitate transport to the next reactor in the system, the residue may be formed into a slurry for pumping by pump 20 through wash filter 22 (optional) where the residue is washed with water for removal of some impurities and to repulper 24 for preparation for feed to reaction vessels 26 shown again as operated in series.

In reactors 26 the antimony sulfide is brought into contact with a nitric acid as about a 1 to about 50 percent solids slurry.

The nitric acid concentration of the aqueous oxidation solution may range from 1 to about 70 percent by weight, preferably from about 2 about 20 percent by weight. At low nitric acid concentrations it is advantageous to supplement the oxdizing power of the nitric acid by the introduction of a source oxygen, which may be air but preferably high purity oxygen or oxygen enriched air.

The reaction is carried out under oxidizing conditions at temperatures from ambient to about 150°C and at pressures from atmospheric to about 300 psig or more. In reactors 26, the antimony sulfide is converted to the oxides of antimony and/or antimonic acid.

The nature of the product formed has been found to be dependent on nitric acid concentration in the oxidation system. At the lower nitric acid concentrations the predominant, if not sole species formed, is $Sb_2O_3$ with a major portion of the species being light stable senarmontite.

While not bound by theory, it is believed that as nitric acid concentration increases the formation of $Sb_2O_4$ is possible. Confirmation of this has not been made since later drying operations can convert some of other oxides of antimony to this species.

At about a nitric acid concentration of about 6 percent, antimony pentoxide is formed. As nitric acid concentration increases still further antimony pentoxide does not appear to occur according to its stoichiometric formula $Sb_2O_5$ but rather the partially hydrated product of antimonic acid. At high nitric acid concentrations the formation of antimonic acid is definitely favored and may be formed as a major product of process through control of nitric acid concentration.

From the foregoing the product may be a mixture of the several oxides of antimony and/or antimonic acid. Independent of the nature of the species present, the product for all practical purposes is amorphous in nature and finely divided making it directly useful as a filler, pigment or intermediate to other forms of antimony.

There is also formed as a direct product of the reaction, elemental sulfur which is added to the sulfur present during the leaching operation and carried along with the antimony sulfide.

While throughout the range of nitric acid concentrations conversion of stibnite is high, of higher nitric acid concentrations some of sulfide present or formed appears to reduce the oxidizing potential of nitric acid and somewhat increases conversion of some of the sulfur to soluble sulfur compounds, normally in the sulfate form.

There is also formed additional soluble by products which will remain in the solution, including soluble arsenic compounds removing some of the residual arsenic compounds carried with the antimony sulfide from the leach operation as well as other soluble nitrates and sulfates depending on the nature of the impurities carried along.

A portion of the nitric acid present is converted to the oxides of nitrogen ($NO$, $NO_2$) which may be vented and oxidized with air to $NO_2$ and absorbed in water to regenerate nitric acid for reuse in the operation.

Again, in using reactors 26 in concurrent series, nitric acid of the desired concentration is brought into contact with a slurry containing the antimony sulfide and the liquid is passed to second reactor 26 where the reaction continues to maximize the conversion of antimony sulfide to oxides of antimony and/or antimonic acid.

There is formed an effluent from the reactor which is a slurry containing solid oxides of antimony and/or antimonic acid and elemental sulfur which are removed and passed to filter 28 where the liquid phase is recovered for recycle to repulper 24. A portion is recycled directly to reactors 26 for reuse with a portion being bled off to remove impurities as they build up. The sulfur and the oxides of antimony and/or antimonic acid are passed to repulper 30 where there is introduced some of the solvent for sulfur to form a fluid phase or slurry. The fluid phase or slurry which is a solution of sulfur in its solvent and solid antimony products and sulfur are passed through stirred vessels 34 and 36, where additional solvent is added, to permit continued dissolution of the sulfur from the antimony products.

Although any solvent which is non reactive with respect to sulfur and the antimony product and which is liquid in the temperature range employed, normally about 80°C or more, may be used, the preferred solvents are trichloroethylene, and tetrachloroethylene.

The slurry which contains the dissolved sulfur and solid oxides of antimony and/or antimonic acid is passed by pump 38 to filter 40 where the solid oxides of antimony and/or antimonic acid is separated from the solution containing dissolved sulfur.

The solution containing the dissolved sulfur is passed to agitated cooler 42 where the temperature of the solution is reduced to permit precipitation of sulfur to form a slurry of elemental sulfur in the solvent. The slurry is then passed by pump 44 to sulfur filter 46. The solvent separated is either recycled or passed to solvent collection vessel 48 for purification and recycle.

Where the solvent is recycled, it is normally passed to separator 50 for removal of water.

The sulfur collected by filter 46 is passed to heater 48 where the sulfur is melted for further purification and collected as a product.

As just one alternative to solvent extraction of sulfur of the antimony products formed, sulfur may also be what may be termed a "balling" process wherein the product from the oxidation zone in the form of a pulp is heated above the melting point of sulfur. Under these conditions the sulfur melt will agglomerate.

Sublimation of sulfur must be avoided, however, as at sublimation temperatures recombination of sulfur with antimony will occur.

The oxides of antimony and/or antimonic acid from filter 40 is passed to heater 52 where depending upon the temperature conditions employed, it is simply dried in the presence of air. Depending on the nature of the antimony products formed, drying may form additional antimonic acid which is the hydrated form of antimony pentoxide. In the alternative, the antimony product may be heated to an elevated temperature in the presence of air to form other oxides of antimony.

For instance, antimony pentoxide may be formed by heating antimonic acid to a temperature from about 110°C. to about 275°C, whereas antimony tetroxide $Sb_2O_4$ may be formed by heating the acid to a temperature of from about 500°C to about 1000°C. If the nitric acid concentration used was 2–4 percent $NHO_3$, a crystalline $Sb_2O_3$ can be obtained by heating the product between 325°C and 500°C.

Whichever product is desired is passed from reactor heater 52 to hopper 54 for product bagging in bagger 56.

The treated gas from reactor 52 may be passed to heater 48 for use in sulfur production.

In the alternative, the antimonic acid or the oxides formed therefrom may be reduced to antimony metal by reaction with hydrogen, carbon, or carbon monoxide at elevated temperatures. The advantages of the process of this invention are several. As compared to conventional processes, the antimony end products are formed with complete conservation of sulfur and there is not generated as a consequence of the practice of this invention sulfur dioxide as an air pollutant. Since any arsenic compounds present are rejected as gangue or are converted to compounds soluble in the nitric acid solution used to form antimonic acid, the process of this invention is amenable to treatment of high arsenic content ores to yield a substantially arsenic-free product which may contain less than 0.1 percent arsenic.

EXAMPLE 1

To 300 parts by weight of a dry stibnite flotation concentrate there was added a solution consisting of 66 parts by weight sulfur, 907 parts by weight of a 24 percent ammonium sulfide solution, 490 parts by weight of a 28 percent ammonium hydroxide solution, and 130 parts by weight water. After stirring the mixture for 1.3 hours at ambient temperature, the solution was filtered.

The undissolved residue or gangue contained quartz, pyrite, a variety of other minerals, and about 5 percent antimony which represented a loss of one-half percent of the antimony contained in the stibnite flotation concentrate.

The filtrate was distilled to recover ammonium sulfide and ammonium hydroxide for recycle and the residue containing purified antimony sulfide, sulfur and some residue liquors was filtered and washed.

The antimony sulfide product was then formed into a 10 percent slurry with 3 percent nitric acid and heated with agitation to about 140°C. in a high pressure stirred reactor under oxygen pressure of 100 psig. After an hour of stirring at essentially constant temperature and pressure, the contents of the reactor were cooled and filtered. The precipitate contained in excess of 99 percent of the antimony in the form of antimony oxide. The precipitate was dried and sulfur leached from the precipitate with trichloroethylene. The antimonic acid was heated in the presence of air at 500°C to produce cystalline $Sb_2O_3$ and drive off any impurities still present.

EXAMPLE 2

Using a leach solution having an assay of 117 g/l $NH_3$, 104 g/l coupled sulfur and 68 g/l free sulfur, four stibnite concentrates from different mines were leached for stibnite recovery. In each instance, the weight ratio for leach liquor to ore concentrate was about 4:1. Table 2 gives the antimony and arsenic analysis of the precipitate obtained from the pregnant liquor, after gangue separation, as well as the undissolved gangue.

Table 2

| Concentrate Source | Sb,% | As,% | Yield[1] Sb,% | As,% |
|---|---|---|---|---|
| Mine A-precipitate | 38 | 0.1 | 75 | 1.3 |
| Mine A-gangue | — | 10.6 | 25 | 98 |
| Mine B-precipitate | 51.3 | 0.1 | 97 | <6 |
| Mine B-gangue | 9.2 | 9.5 | 3 | >94 |
| Mine C-precipitate | 57 | 0.05 | 89 | 21 |
| Mine C-gangue | 52 | 1.3 | 11 | 79 |
| Mine D-precipitate | 46.6 | 0.03 | 99 | 93 |
| Mine D-gangue | 5.5 | 0.2 | 1 | 7 |

[1]Yield = % of total originally present

The gangue and precipitate from Mine D were subjected to semi-quantitative spectrographic analysis for the content of its elements. The results are shown in Table 3.

Table 3

| Element | Gangue, % | Repp't. $Sb_2S_3$, % |
|---|---|---|
| Si | 15 | 0.011 |
| Fe | 13 | 0.003 |
| Ca | 5.7 | 0.06 |
| Mg | 6.2 | 0.018 |
| Pb | 3.6 | trace |
| Sb | 5.0 | 72 |
| As | 0.2 | n.d.[2] |
| Al | 0.69 | nil |
| Cu | 0.05 | .01 |
| Zn | 2.2 | nil |
| Cd | 0.03 | nil |
| Ag | 0.025 | 0.0067 |

[2]n.d. = not detected by method used and was therefore less than 0.06%

Each precipitate was oxidized with nitric acid which resulted in the formation of a precipitate containing predominately oxides of antimony, antimonic acid, sulfur and approximately one-half of the arsenic present in the precipitate processed.

What is claimed is:

1. A process for the production of antimony oxide and/or antimonic acid from stibnite-bearing ores and ore concentrates which comprises:
   a. contacting the stibnite-bearing ore with an aqueous leach solution comprising from about 5 to about 30% by weight ammonium sulfide and from about 0.1 to about 10 percent by weight sulfur at a temperature from ambient to about 90°C to form an ore gangue and a mother liquor containing extracted antimony sulfide;
   b. separating the mother liquor from the gangue;
   c. eliminating ammonia from the mother liquor and forming a precipitate of antimony sulfide and sulfur;
   d. reacting the formed precipitate with an aqueous oxidizing nitric acid solution containing from 1 to about 70 percent by weight nitric acid at a temperature from ambient to about 150°C and a pressure from atmospheric to about 300 psig to form a slurry of insoluble sulfur and antimony compounds selected from the group consisting of the oxides of antimony and antimonic acid in the nitric acid solution;
   e. separating the sulfur and antimony compounds from the nitric acid solution; and
   f. separating the sulfur from the antimony compounds.

2. The process as claimed in claim 1 in which ammonium hydroxide is present in the leach solution in an amount of up to about 18 percent by weight of the leach solution.

3. The process as claimed in claim 1 in which the ammonia is eliminated by neutralization.

4. The process as claimed in claim 1 in which oxygen is present in the oxidizing nitric acid solution.

5. The process as claimed in claim 1 in which the ammonia is eliminated by distilling the mother liquor to recover ammonium sulfide.

6. The process as claimed in claim 2 in which the ammonia is eliminated by distilling the mother liquor to recover compounds selected from the group consisting of ammonium sulfide and a mixture of ammonium sulfide and ammonium hydroxide.

7. The process as claimed in claim 1 in which the nitric acid concentration in the aqueous nitric solution is from about 2 to about 20 percent by weight.

8. The process as claimed in claim 1 in which the formed precipitate is reacted in the presence of oxygen at an oxygen pressure of from 1 psia to about 300 psig.

9. The process as claimed in claim 7 in which the formed precipitate is reacted in the presence of oxygen at an oxygen pressure of from 1 psia to about 300 psig.

10. The process as claimed in claim 1 in which sulfur is separated from the antimony compounds by a solvent for sulfur.

11. The process as claimed in claim 10 in which the solvent is selected from the group consisting of carbon disulfide, trichloroethylene and tetrachloroethylene.

12. The process as claimed in claim 1 in which the stibnite-bearing ore is leached at a temperature from ambient to about 70°C.

13. The process as claimed in claim 1 in which the precipitate comprising antimony sulfide and sulfur is reacted with the aqueous nitric acid solution at a temperature from ambient to about 150°C.

14. The process as claimed in claim 7 in which the precipitate comprising antimony sulfide and sulfur is reacted with the aqueous nitric acid solution at a temperature from ambient to about 150°C.

15. The process as claimed in claim 8 in which the precipitate comprising antimony sulfide and sulfur is reacted with the aqueous nitric acid solution at a temperature from ambient to about 150°C.

* * * * *